LATCH MECHANISM FOR A RETRACTILE CORD REEL

Filed Aug. 14, 1967

INVENTORS H. A. HILSINGER, JR.
W. J. KINDERMANN
BY E. J. Olinder
ATTORNEY

United States Patent Office 3,462,095
Patented Aug. 19, 1969

3,462,095

LATCH MECHANISM FOR A RETRACTILE CORD REEL

Harry A. Hilsinger, Jr., Hope Township, Warren County, and Wilfred J. Kindermann, Chatham, N.J., assignors to Bell Telephone Laboratories, Incorporated, Murray Hill, N.J., a corporation of New York Filed Aug. 14, 1967, Ser. No. 660,377
Int. Cl. B65h 75/48
U.S. Cl. 242—107.7 8 Claims

ABSTRACT OF THE DISCLOSURE

In a spring loaded reel for automatically retracting and storing a line or cord, an automatic latch is held magnetically in the unlatched position or is shifted magnetically to a latched position depending upon the rotational speed and position of the reel, thereby permitting the cord to be held at any particular position of travel at the option of the user without placing spring tension on the cord.

BACKGROUND OF THE INVENTION

Field of the invention

This invention relates to spring loaded reels for automatically retracting and storing lines or cords and particularly to automatic latches for such devices that serve to hold the cord in any particular position of travel at the option of the user without placing tension on the cord.

Description of the prior art

Spring loaded reels are in common usage in a wide variety of applications from window shade rollers to retractile telephone cords. In the telephone art in particular, the use of such arrangements is increasing at a rapid rate, owing to the increased use of flush or panel phones and similar custom phones where out-of-sight storage of telephone handset cords is highly desirable from the standpoint of both appearance and convenience.

Despite the increasing use of cord retracting reels for telephone handsets, a persistent problem remains to be solved before such devices can achieve their full potential utility. Cord retracting reels typically exert a certain amount of tension on the cord as the cord unwinds on the reel hub in response to the force exerted on the cord as the user pulls on the handset. The retracting force exerted on the reel, although not great, remains constant while the user holds the handset, thus requiring the user to exert a continuous balancing force to maintain the cord in position. The requirement that the user constantly oppose the force of the reel with a balancing force is a source of annoyance and tends to offset the desirable aspects of such retractile cords.

One means of overcoming the disadvantage noted is to employ a catch or latch device, which may be of the type commonly found on window shade rollers for example, that effectively snubs the cord when it is brought gently to rest and which releases the cord from its snubbed condition whenever the cord is pulled out abruptly and abruptly released. Known catch devices of the type described do not readily lend themselves to adaptation for telephone cord use, however, in that reliability is typically far below the standards required for telephone equipment. High reliability can be obtained with ratchet type catches, but these have an undesirably high operating noise. Certain gravity operated catches have suitable reliability and low noise levels but have a limited versatility of application in that a particular mounting configuration or physical attitude is required owing to the operational reliance on gravity. Additionally, a number of known catches lack the simplicity that is essential for low cost production.

Some of the problems indicated have been met by a magnetically operated catch as shown by H. A. Hilsinger, Jr. in his application Ser. No. 533,533 dated Mar. 11, 1966, now U.S. Patent 3,378,214 issued Apr. 16, 1968. In such arrangements, however, a spring is required to provide a biasing force to maintain the latch in a normally unlatched condition. The employment of such a spring is undesirable from the standpoint of reliability, cost and complexity.

Accordingly, one object of the invention is to enhance the reliability of cord reel latch devices.

Other objects include reducing the cost of cord reel latches and simplifying their construction.

SUMMARY OF THE INVENTION

These and other objects are achieved in accordance with the principles of the invention by uniquely turning to account a pair of opposing magnetic forces that ensure complete reliability irrespective of the particular position in which the reel is mounted. Moreover, in accordance with the invention no spring means are required to bias the latch and accordingly no special adjustments are required to ensure the proper level of latch-biasing force.

In one illustrative embodiment, a reel comprising a pair of cord retaining flanges and an integral connecting hub is affixed to a stationary mounting or reel casing. One or more magnets are mounted in radial fashion near to the periphery of one of the reel flanges with common poles of attraction pointed outwardly. A pivotally mounted reel latch is affixed to an extension of the reel casing. The latch includes a small integral magnet with the pole nearest the reel being opposite in kind to the poles of the magnets mounted on the reel flange. The other pole of the latch magnet acts as a biasing force that attracts the latch to an unoperated position against a portion of the reel casing. When one of the reel magnets moves past the latch as the reel rotates, magnetic force is exerted on the latch to bring it into arresting engagement against a notch on the flange. Engagement occurs, however, only if the reel is rotating in the wind-up or reel-in direction and further, only if the speed of the reel magnet past the latch is sufficiently slow to permit the magnetic force toward the reel to overcome the magnetic latch biasing force and the latch inertia that normally maintains the latch in the nonoperated or unengaged position.

DESCRIPTION OF AN ILLUSTRATIVE EMBODIMENT

Figure 1:
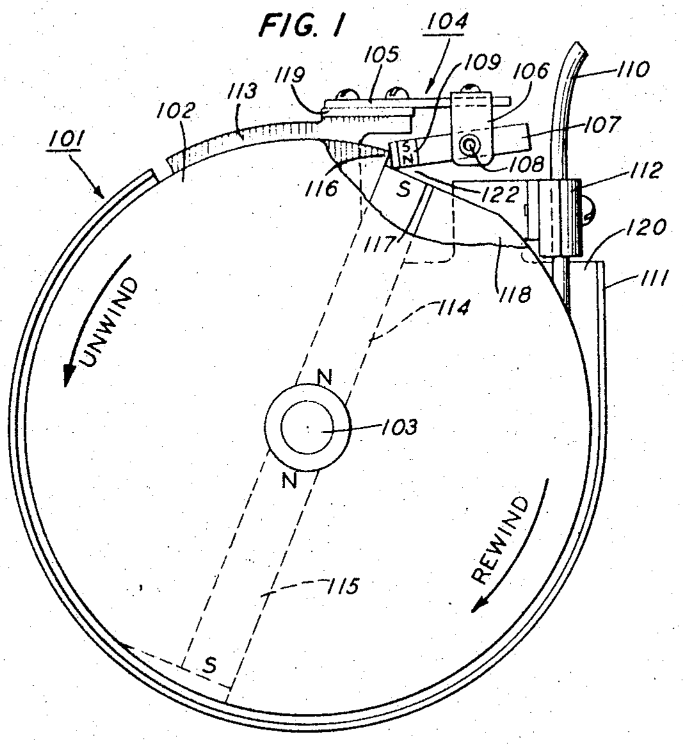
FIG. 1 is a partially broken away sketch in plan view of a retractile cord reel with a latch mechanism in accordance with the invention showing the latch in the latched position.

In FIG. 1 a cord 110, which may be a telephone handset cord for example, is shown protruding from a cord reel assembly 101. The reel 101 includes a pair of cord retaining flange members one of which 118 is shown. A cover disc 102 is superimposed upon the flange 118 and the assembly is mounted for rotational movement about a hub 103. The basic construction of the reel assembly 101 may be substantially identical to any one of a number of conventional cord retracting reels having internally mounted conducting spring members that terminate the individual conductors of the cord 110 and accordingly form a part of the electrical circuit. Such reels typically exert a steady retracting force on the cord irrespective of the amount of the cord accommodated by the reel and irrespective of the particular rotational position of the reel. A reel of this general form is shown in Patent 1,247,358 issued to J. Zwilling Nov. 20, 1917.

Figure 2:
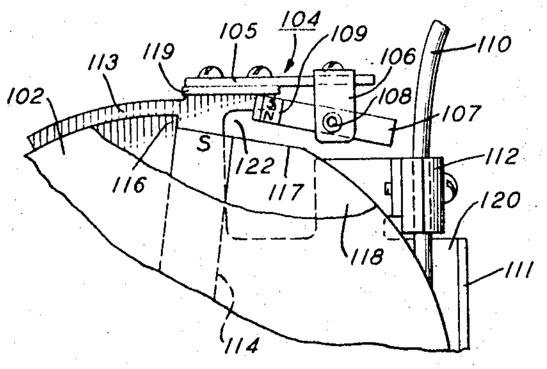
FIG. 2 is a sketch of the latch mechanism of FIG. 1 illustrating the unlatched position.

As shown in FIG. 2, the reel assembly 101 also includes an outer casing member 113 a portion of which 111 forms an accommodating entrance slot 120 for the cord 110. The cord is further positioned by a guide bracket 112 which is also an extension of the outer casing or housing 113 and therefore not rotatable. Mounted on the casing 113 is a catch or latch assembly 104 that includes a cantilever mounting strip 105, a vertical bracket 106 and a pawl 107 mounted for pivotal movement about a pin 108.

In accordance with the invention a small magnet 109 is affixed to the left or operating end of the pawl 107. Alternatively, as shown, the magnet 109 may be constructed as an integral part of the pawl and may, for example, be mounted in an accommodating aperture in the pawl. As shown, the poles N and S of the magnet 109 extend respectively to the bottom and top of the pawl 107. The housing 113 is constructed of a magnetic material such as steel, for example. As a result, the normal or unlatched condition of the pawl 107 is as shown in FIG. 2 with the magnet 109 attracted to and held against a projection 119 of the housing 113.

In accordance with the invention and as shown in FIG. 1, two diametrically opposed bar magnets 114 and 115 are mounted on the flange 118. Alternatively, it may be desirable to mount the magnets on an auxiliary superimposed flange rather than directly upon one of the line retaining flanges. At the point on the periphery of the flange 118 where the end of the magnet 114 is exposed, the periphery of the flange 118 is notched by a recessed area 122 bounded by a flat cam portion 117 and a vertical stop portion or shoulder 116. A similar recessed portion or notch is provided at the exposed end of the magnet 115.

When force is exerted on the cord 110 to unwind it from its accommodating reel 101, the reel rotates and alternate ones of the magnets 114 and 115 move underneath the magnet 109 of the pawl 107. If the reel 101 is rotated with sufficient speed, insufficient time is permitted for the attractive force between the unlike poles of the magnet 109 and the magnets 114 or 115 to overcome the catch inertia and the magnetic attraction between the magnet 109 and the projection 119 of the housing 113. Accordingly, the pawl 107 remains in its unoperated position illustrated in FIG. 2.

In the event that the cord 110 is unwound very slowly from the reel 101, the only difference in operation that occurs is that each reel magnet such as magnet 114 attracts magnet 109 away from its unlatched position and it pivots downwardly to the position shown in FIG. 1. Owing to the direction (unwind) of rotation, however, arresting engagement does not occur and as the reel moves the pawl 107 is cammed upwardly by the cam surface 117 to the point at which the magnetic attraction between the magnet 109 and the projection 119 is sufficient to pivot the pawl upwardly to the position shown in FIG. 2.

In view of the foregoing description, it is evident that if the cord 110 is released gradually from a fully or partially unwound condition, permitting the rewind springs, not shown, to rotate the reel in the clockwise or rewind direction, the pawl 107 will come into arresting engagement with the notch 116 with the result that the user is no longer required to maintain holding force on the cord 110 in order to prevent further rewind.

If the cord 110 is released abruptly, however, with the reel 101 in a position where neither of the magnets 114 or 115 is in close proximity to the pawl 107, the speed of rewind is sufficiently great to prevent the pawl 107 from swinging downwardly into arresting engagement with the flange 118. If, however, tension on cord 110 is slacked off rather gradually, sufficient time is made available for one of the magnets 114 or 115 to overcome the catch inertia and the magnetic force between magnet 109 and the projection 119 so that the pawl 107 is permitted to swing downwardly into arresting engagement with the flange 18 as shown in FIG. 1.

To release the latch 104 from its engaged condition simply requires that the user unreel a sufficient amount of the cord 110 so that the reel magnet 114 rotates clear of the pawl 107 permitting the latch to return to its unengaged condition as shown in FIG. 2. As described above, if at that point restraining force on cord 110 is suddenly released, the reel 101 is permitted to rotate in a clockwise direction beneath the pawl 107 with sufficient speed to prevent neither of the magnets 114 or 115 from overcoming the combination of latch inertia and the magnetic biasing force which normally maintains the latch in the unoperated position.

It is evident that the relative strength of the opposing magnetic forces which tend to maintain the pawl 107 in the unoperated condition or which tend to bring it into arresting engagement with the reel is the key factor in determining the speed at which the latch will operate. Although two latch operating magnets 114 and 115 are shown in the embodiment of the invention disclosed herein, either a single magnet or several magnets similarly disposed may be employed, the particular number selected being determined primarily by reel size, cost and the degree of rewind desired before the catch operates when the cord is released from a random position.

It is to be understood that the embodiment described herein is merely illustrative of the principles of the invention. Various modifications may be made thereto by persons skilled in the art without departing from the spirit and scope of the invention.

What is claimed is:

1. Apparatus for retracting and storing a line, comprising, in combination, a spring loaded reel including a pair of line retaining flange members mounted for rotational movement on a hub, a pivotally mounted latch, first magnetic means for attracting said latch to an engaging arresting position with said reel, second magnetic means for normally biasing said latch in an unengaged position clear of said reel, said first and second magnetic means comprising opposing forces, the determination of which of said forces overcomes the other being dependent upon the speed, direction and position of rotation of said reel, and upon the relative magnitude of said forces.

2. Apparatus in accordance with claim 1 wherein said first magnetic means comprises the combination of a first magnet mounted on said latch and a second magnet mounted on said reel and wherein said second magnetic means comprises the combination of said first magnet and a magnetically attractable portion of a fixed nonrotatable reel casing member.

3. Apparatus in accordance with claim 2 wherein said reel includes a notched portion adjacent to said second magnet thereby to enable arresting engagement with said latch.

4. Apparatus in accordance with claim 3 wherein said latch comprises a pawl pivotally mounted on said casing member.

5. Apparatus in accordance with claim 4 wherein said first magnet is integrally positioned within said pawl.

6. A retractable cord reel comprising, in combination, a pair of rotatably mounted line retaining flange members, said reel being spring biased against the unreeling of said cord, at least one magnet radially mounted on one of said flange members, one pole of said magnet being substantially on the periphery of said one flange member, a fixed reel housing portion, a latch mechanism mounted on said housing portion, said mechanism comprising a pivotally mounted pawl including a second magnet having a pole thereof opposite in kind to said one pole disposed toward said periphery, said periphery having a notched portion placed for arresting engagement with said pawl, said pawl being normally biased out of engagement with said notched portion by the attractive force between said second magnet and a magnetically attractable portion of said housing portion, the arresting engagement of said pawl with said notched portion being determined by the relative attractive forces between said one magnet and said second magnet and between said second magnet and said housing and by the speed and direction of rotation of said reel.

7. A retractable cord reel comprising, in combination, a spring loaded rotatable reel including a pair of line retaining flange members, a plurality of magnets radially mounted on one of said flange members each having a common pole thereof substantially at the periphery of said one flange member, said one flange member having a plurality of notches on the periphery thereof, each being adjacent to a respective one of said magnets, a magnetic pawl mounted for pivotal movement, said pawl being attractable to each of said magnets thereby being pivotally actuable into arresting engagement with a corresponding one of said notches, said pawl being normally held free from said engagement by the magnetic force between said pawl and a magnetically attractable portion of the mounting for said pawl.

8. Apparatus in accordance with claim 7 wherein said mounting comprises a fixed cover portion for said reel.

References Cited

UNITED STATES PATENTS

| | | | |
|---|---|---|---|
| 2,341,440 | 2/1944 | Hammer | 160—298 |
| 2,515,708 | 7/1950 | Hammer | 160—298 |
| 2,726,826 | 12/1955 | Hoven et al. | 242—107.4 |
| 2,732,149 | 1/1956 | Whittingham et al. | 242—107.4 |
| 3,378,214 | 4/1968 | Hilsinger | 242—107.7 |

WILLIAM S. BURDEN, Primary Examiner